United States Patent [19]

Recchia et al.

[11] Patent Number: 5,509,994

[45] Date of Patent: Apr. 23, 1996

[54] GUN FOR TIE WRAPPING BUNDLES OF ELONGATED ARTICLES

[75] Inventors: Matthew M. Recchia, Coram; Joseph J. Hernandez, Patchogue; Anwar K. Chitayat, Ft. Salagona; John A. Sehlmeyer, Mt. Sinai, all of N.Y.

[73] Assignee: Anorad Corporation, Hauppauge, N.Y.

[21] Appl. No.: 252,997

[22] Filed: Jun. 2, 1994

[51] Int. Cl.⁶ ........................................... B65B 13/32
[52] U.S. Cl. ................. 156/468; 156/73.4; 156/495; 156/580.2; 100/26; 100/33 PB
[58] Field of Search .................... 156/73.1, 73.4, 156/580.1, 580.2, 468, 495, 579; 425/174.2; 100/26, 33 PB

[56] References Cited

U.S. PATENT DOCUMENTS

| | | | |
|---|---|---|---|
| 4,499,845 | 2/1985 | Pope | 156/580.2 X |
| 4,529,473 | 7/1985 | Mims | 156/580.2 |
| 4,534,817 | 8/1985 | O'Sullivan | 156/580.1 X |
| 4,842,671 | 6/1989 | Nuss | 156/580.2 X |
| 4,904,319 | 2/1990 | Divincenzo et al. | 156/580.2 X |
| 4,952,271 | 8/1990 | Cheung et al. | 156/502 |
| 5,062,920 | 11/1991 | Horikx et al. | 156/580.2 X |

*Primary Examiner*—David A. Simmons
*Assistant Examiner*—J. Sells
*Attorney, Agent, or Firm*—George J. Brandt, Jr.; Thomas R. Morrison

[57] ABSTRACT

A tie gun for tying elongated bundles with a polymeric material tape loop, the loop having overlapped tape lengths, the overlapped material being welded with an ultra sonic horn, this horn embodying a horn tip end which with a clamp, and an anvil arrangement holds the loop in such way that a tape stock section just upstream of the weldment is weakened by horn operation disrupting at least some of the molecular orientation in the material so that the stock can be separated from the loop with an upstream directed pulling force applied to the tape stock resulting in a severance that leaves no objectionable protuberance or tab at the weldment. The tie gun also includes a quick release for freeing a tape build up in the gun incident a tape feed jam. A face of the clamp, face surfaces of the anvils and the horn tip end define a funnel envelope to facilitate tape stock feed to tape loop forming jaws on the gun at the outset of a tying cycle.

13 Claims, 10 Drawing Sheets

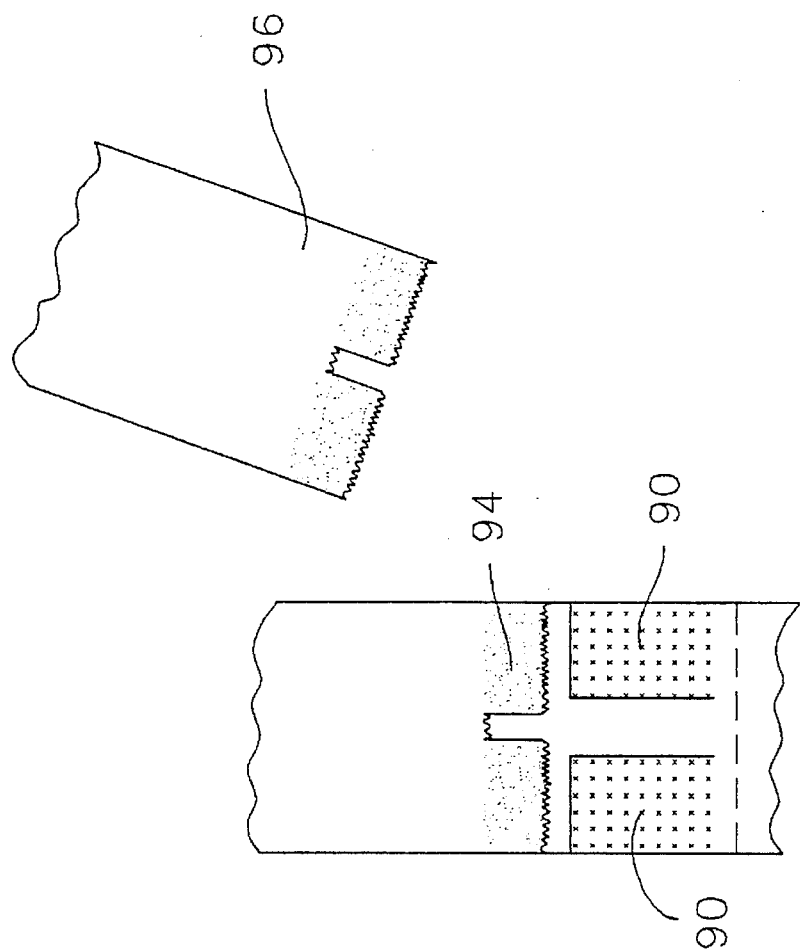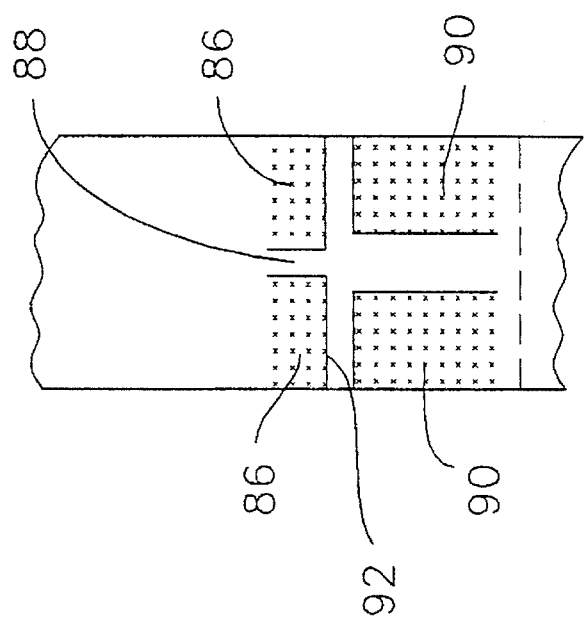

GUN FOR TIE WRAPPING BUNDLES OF ELONGATED ARTICLES

BACKGROUND OF THE INVENTION

The present invention relates to a tie gun for wrapping and fixing a tape loop around a bundle of elongated articles and, more particularly, to a tie gun with which tape stock is removed from a formed loop in manner as leaves no more than innocuous tape material tab residue.

Various constructions of tie guns and like devices for tying bundles of elongated articles in a compact array thereof are known. Widely practiced uses of these devices is for tying electrical wire bundles in vehicles and environments where it is sought to restrain the wires from contact with chafing surfaces on environment structure, to hold them in manner as precludes their presenting obstruction to tools and workers performing tasks about the wires etc.

Representative of such tie guns and devices are U.S. Pat. Nos. 3,391,440; 4,094,342; 4,178,973; 4,263,687; 4,368,762; 4,371,010; 4,502,905; 4,534,817 and 4,610,067.

In known tie gun constructions, it is common that severance of the tape in a tied loop from a stock run is effected with a cutter such as a knife element. A disadvantage of such manner of severing a welded loop from the stock run is the leaving of a tab at the weld which tab, and due to the material nature and small thickness of the tape, presents an objectionable protuberance that can cause injury to a worker's fingers. It also may be an obstruction on which a tool being used by a worker in a confined space where the tie is located in end use purpose can become caught. Also where a tab in a tied loop exists, the same came represents an agency by which undesired peel of the loop securement might be deliberately or accidentally effected.

A known construction of tie gun uses a micro wave generator for effecting welding of the loop. After welding, a cutting wire located proximal the area of tape weldment is resistance heated to cause melting across the tape stock and consequent severing of the tape stock from the welded loop. While the residue of melted tape on the loop at point of severance is less than where mechanical cutting is used, there is still some tab like presence that would better be eliminated.

Known constructions in some instances feed tape from the stock to loop forming locations in a way that misfeed of tape results in undesirable and hard to remove tape pile up in the device sometimes necessitating some disassembly of gun components to effect tape release and clearance.

Additionally, some constructions are susceptible to tape leading end slippage when a loop is tightened around an article bundle before welding is carried out resulting in failure to achieve a permanent loop hold around the articles. To prevent against this requires very high clamping pressure applied against the tape leading end where same is overlapped with loop closing length of the tape stock.

It is desirable therefore that an improved tie gun construction be provided to overcome these as well as other disadvantages present in known types of constructions.

OBJECTS AND SUMMARY OF THE INVENTION

Accordingly, it is an object of the invention to provide a tie gun for loop tying a bundle of elongated articles which overcomes the drawbacks of the prior art.

It is a further object of the invention to provide a tie gun with which a stock run of tape material can be separated from a tied loop without leaving any tab of tape material protuberant from a loop material weldment.

It is a still further object of the invention to provide a tie gun which embodies means for effecting quick release of tape misfeed jams occurring in the gun.

Another object is to define with structure at the location of tape entry to the inside periphery of a pair of closed gun jaws so tape feeding around such periphery to form a loop around articles to be wrapped, a guidance envelope which directs a tape leading end with surety into a feed course passing onto the said periphery as is intended and without deviation therefrom.

Briefly stated, there is provided a tie gun device for tying elongated bundles with a polymeric material tape loop. This tape loop will have overlapped tape lengths, the overlapped material being welded with an ultra sonic horn, this horn embodying a horn tip end which with a clamp and an anvil arrangement holds the loop in such way that a tape stock section just upstream of the weldment is weakened by the welding operation so that the stock can be separated from the loop with an upstream directed pulling force applied to the tape stock. The result is a severance that leaves no objectionable protuberance or tab at the weldment. The tie gun also includes a quick release for freeing a tape build up in the gun incident a tape feed jam. A face of the clamp faces surfaces of the anvils and the horn tip end and defines therewith a funnel envelope to facilitate tape stock feed to tape loop forming jaws on the gun at the outset of a tying cycle.

In accordance with these and other objects of the invention, there is provided a tie wrap device for tightly winding a tape loop of a polymeric material tape encirclingly around a bundle of longitudinally arrayed articles. The device includes a pair of jaws movable between an open condition wherein the jaws are positioned to gird the article bundle to a closed condition in which the jaws present an encirclement of the bundle so that a tape feed from a tape stock can be advanced around an inner periphery of the jaws in a bundle encircling loose tape loop. The tape loop includes overlap of a tape leading end length with a stock length remote from the said tape leading end. Means are provided for tightening the loose loop in a tight closely encircling course about the said article bundle. There also is provided an ultra sonic heating horn having a tip end proximal an exterior side location of the tape overlap. A clamp having a front face adjacent said heating horn is positioned adjacent below the said tape overlap exterior side location. A pair of anvils having face surfaces are positioned in facing relation to an inner side location of the tape overlap and are movable to urge at least some of the tape overlap at the exterior side location thereof into tight contact with at least a part of the heating horn tip end. The anvil face surfaces and the horn tip end are configured and disposed such that other parts of the tape overlap at the exterior side thereof are closely proximal the horn tip end but not in tight contact therewith. The ultra sonic heating horn is operable to effect sufficient heating of the tape overlap part in tight contact with the horn tip end to cause melt coalescence of the material in the tape overlap part which upon cooling establishes weldment of at least part of the tape stock leading edge length to at least part of the remote length part. The ultra sonic heating horn also operates to effect at least some molecular alignment disruption in the tape material at the tape overlap exterior side proximal the horn tip end but which is not in tight contact therewith. Where so disrupted the tape material is weakened sufficiently to allow separation of the tape stock upstream of the weldment from the loop along a non residue leaving break course and effected with a pulling force applied to the tape stock in a direction upstream of the weldment.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 9a is a plan depiction of the tape at the loop welded area before separation;

FIG. 9b is a plan view depiction of the loop welded area following separation;

DETAILED DESCRIPTION OF THE PREFERRED EMBODIMENT

Figure 1:
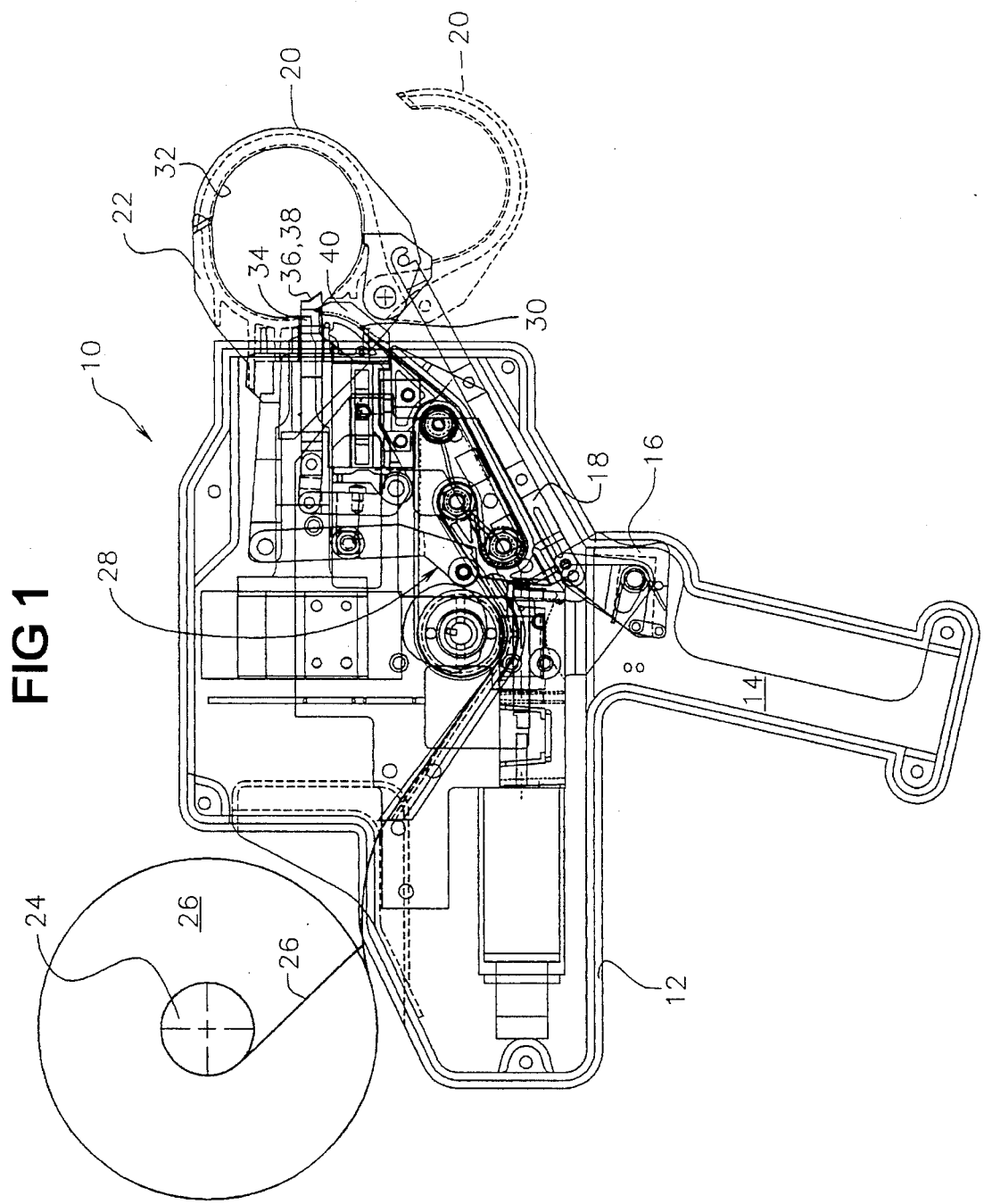
FIG. 1 is a side elevational view of a tie gun constructed in accordance with the invention, the gun housing side cover being removed so that the several structural components of the gun can be seen.

The tie gun 10 shown in FIG. 1 is intended to operate in a timed cycle to effect loose tape loop wraparound of a bundle of elongated articles with a predetermined length of tape feed following initiation of the cycle, cinching or tightening of the loose loop about the articles, urging of the tape overlap of the loop into contact with the ultra sonic heating horn to produce the weldment and weakened tape structure adjacent the weldment so that on cooling at the weldment, reverse feed of the tape towards the stock source, e.g., to provide a pulling force needed to sever or breakaway the tape stock run from the loop effects such severance. A tape feed motor and a motor utilized in connection with anvil movement etc operation can be controlled with a built in microprocessor (not shown).

The tie gun 10 includes a housing 12 (near side cover is removed) holding the operating and control components and has a handle part 14 with which the device is held in use, this handle embodying a trigger 16 connected by linkage 18 to jaw 20 of the jaw pair 20, 22 so that depressing of the trigger moves jaw 20 from normally open (dashed line) to closed (solid line) position. The jaws in open condition gird the article bundle to be tied and then will be closed, depression of trigger 16 also being used to electrically initiate the tying cycle.

The tie gun 10 mounts a reel 24 holding a stock of polymeric tying tape 26 which tape is available in numbers of specific such materials and in various dimensioned thicknesses and widths predicated by particular tying use requirements. Tape 26 off feeds from the reel 24 and passes through the gun body in a course that passes through tape feed means 28 which will be detailed later on, the tape feed having a leading end as at 30 where it is positioned to be fed outwardly on the gun in loop forming travel at the start of the taping cycle.

The tape leading end 30 is fed around the inner periphery 32 of the closed jaws to present a loose loop encircling an article bundle.

Figure 2:
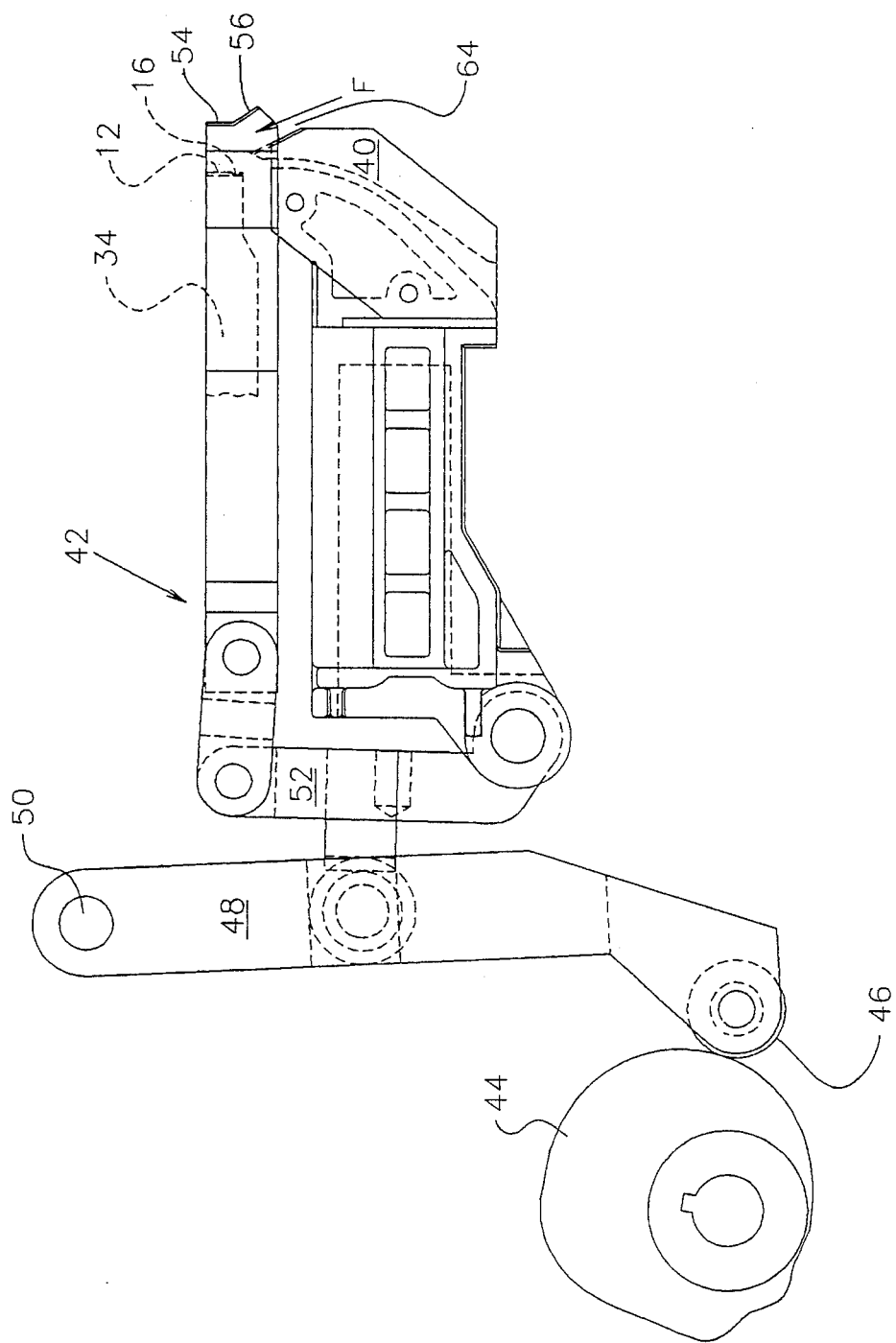
FIG. 2 is a side elevational view showing on enlarged scale, mounting of the ultra sonic horn, anvils and clamp as well as certain of the components involved in effecting clamping and unclamping movements of these components.
Figure 3:
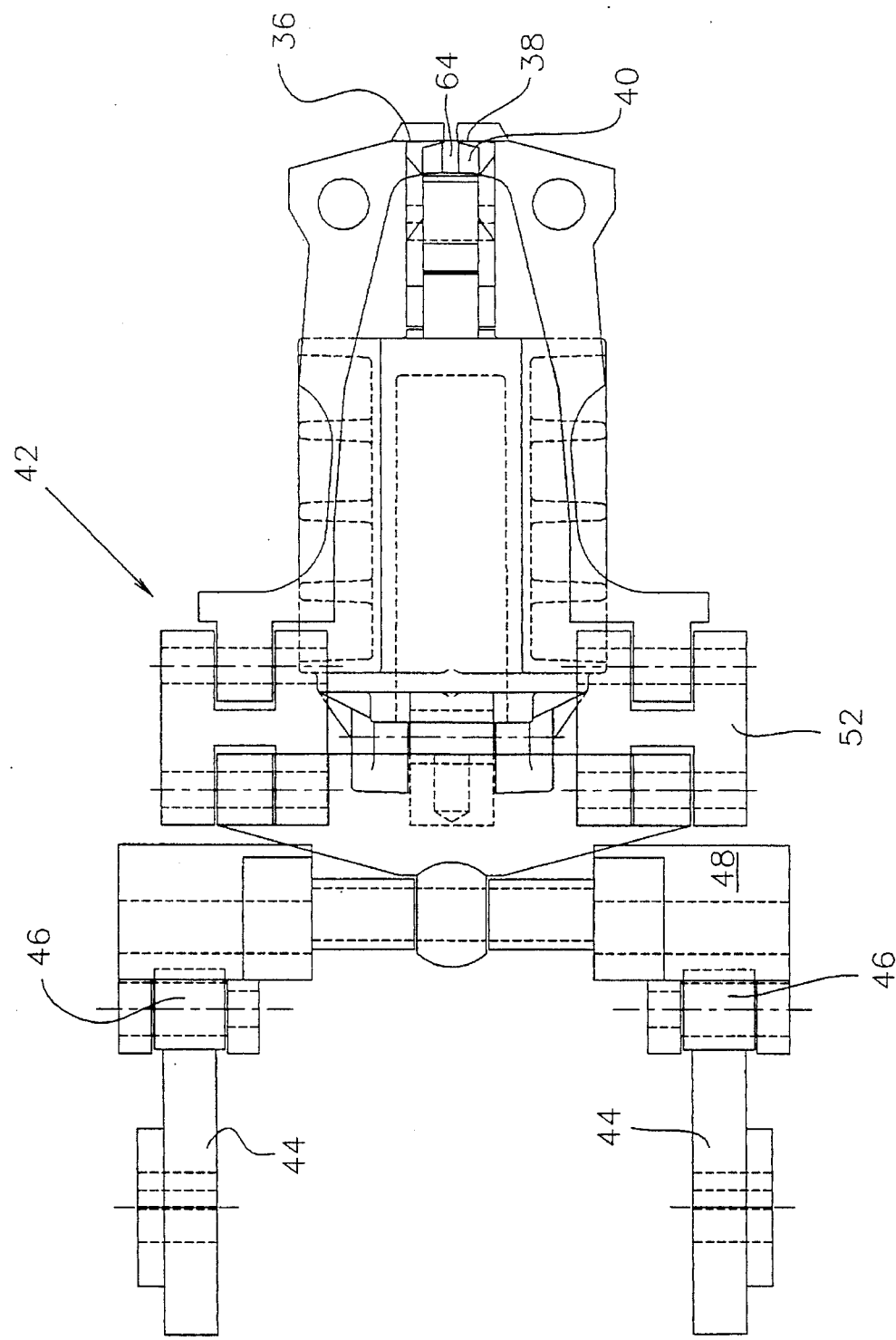
FIG. 3 is a top plan view of the FIG. 2 components.

Referring to FIGS. 1–4, the gun 10 includes an ultra sonic heating horn 34, a pair of anvils 36, 38, and a clamp 40, these elements being located proximal the rear side of the jaws 20, 22 and where the tape feed emerges from the gun housing to traverse the jaws in loop forming travel. Motive mechanism 42 for extending and retracting the anvils 36, 38 and clamp 40 also is provided in the housing and certain details of such mechanism is depicted in FIGS. 2 and 3.

Figure 11:
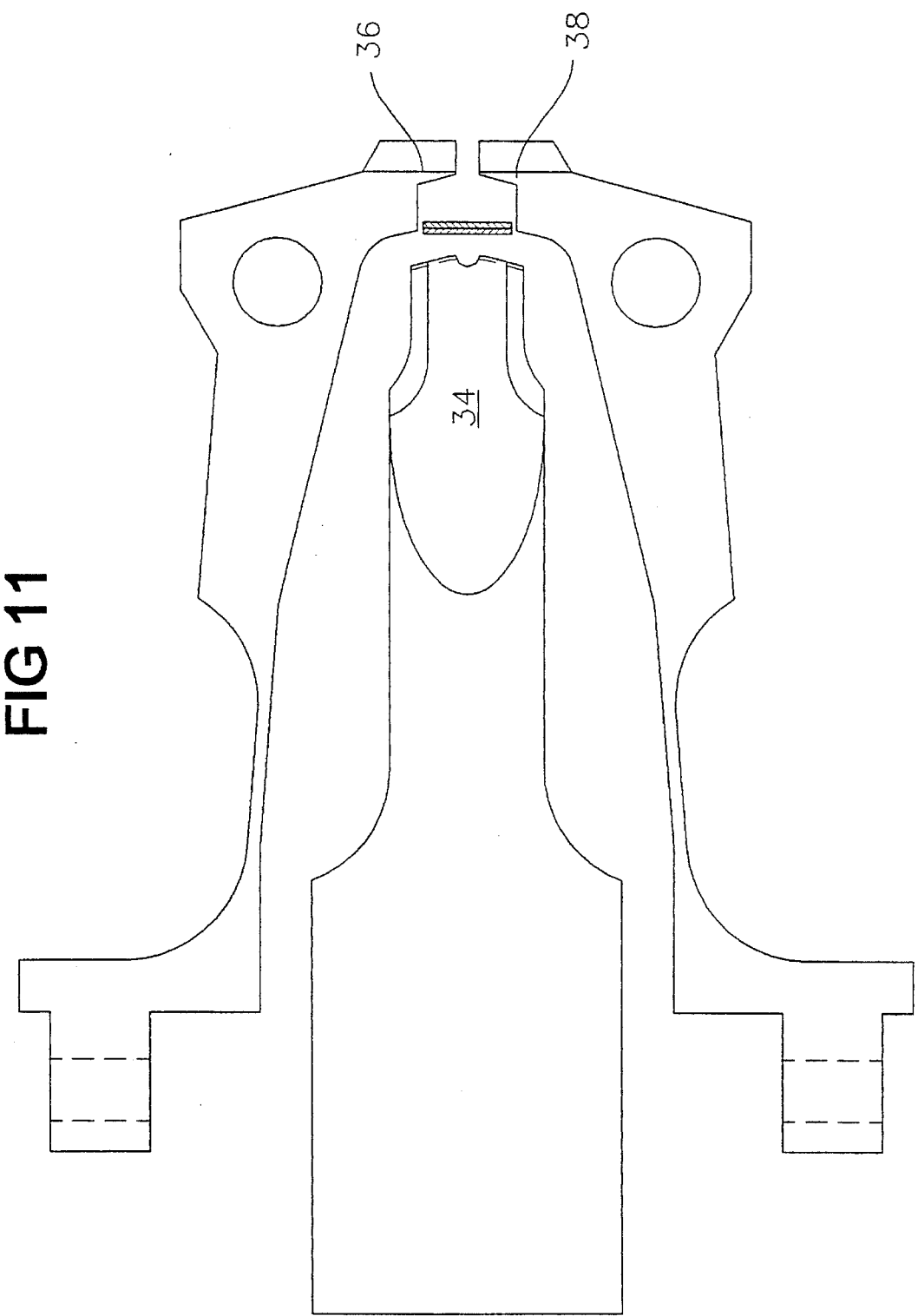
FIGS. 11 and 12 are fragmentary plan views on greatly enlarged scale of front end areas of the anvils and clamp showing the relative positionings between these when the anvils and clamp are in respective intermediate extended and fully retracted conditions.
Figure 12:
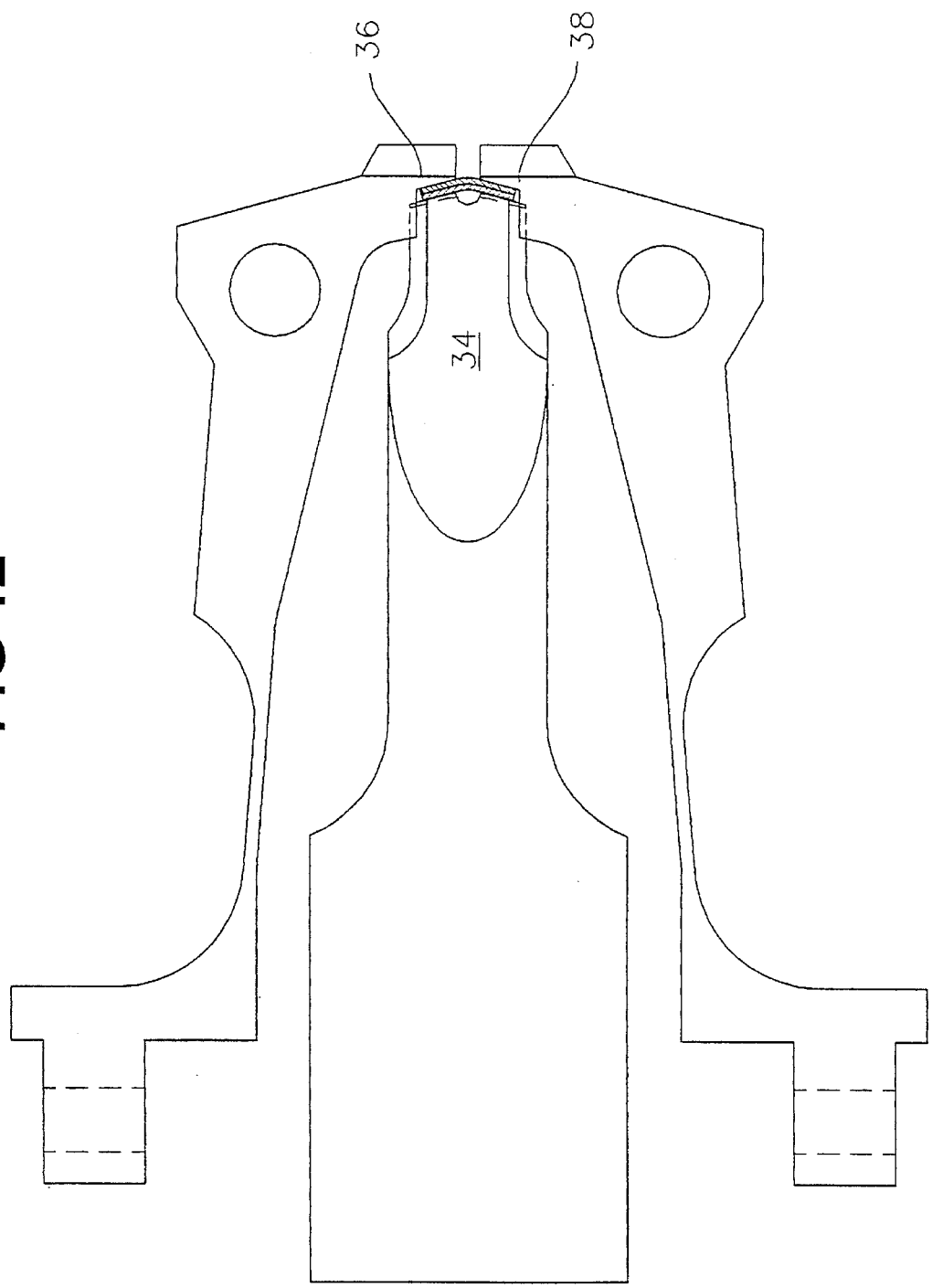

The mechanism 42 includes a powered rotary cam 44 engaged with a follower 46 carried on a lever 48 pivoted as at 50. The lever 48 is connected to another lever 52, and this in turn to structure mounting the anvils and clamp. In such manner, the anvils 36, 38 and clamp 40 are longitudinally extended and retracted in the course of the tying cycle for purpose as will be seen later. The anvils 36, 38 also laterally widen in terminal forward travel of same and they laterally narrow in initial rearward retraction travel. This last mentioned mode of anvil movement is known in the art, e.g., from U.S. Pat. No. 4,534,817. Retraction of the anvils from an intermediate forward to rearmost position is seen with reference to FIGS. 11 and 12 which depicts overlapped tape positioned therebetween.

As seen from FIGS. 2 and 3, the anvils 36, 38 each have upper 54 and lower 56 parts and the lower parts 56 being angled forwardly of the upper parts 54 and the rear faces of these are tapered slightly rearwardly as well, so that the upper parts 54 conform with like angled face surfaces 58, 60 (FIG. 5) of the tip end of the ultra sonic heating horn 34 when the anvils are used to urge a tape loop overlap into tight contact against an upper part of the heating horn tip end during welding of the overlapped tape.

The rear faces of the two anvils 36, 38, both upper 54 and lower 56 parts thereof along with a flat 64 in the front face of the clamp (FIG. 4) define a funnel envelope, shown generally at F in FIG. 2 that serves to guide the tape feed leading edge 30 into the inside of the closed jaws 20, 22 so that proper registry of the tape on the jaw inner periphery 32 is effected and proper loop forming accomplished.

Figure 8:
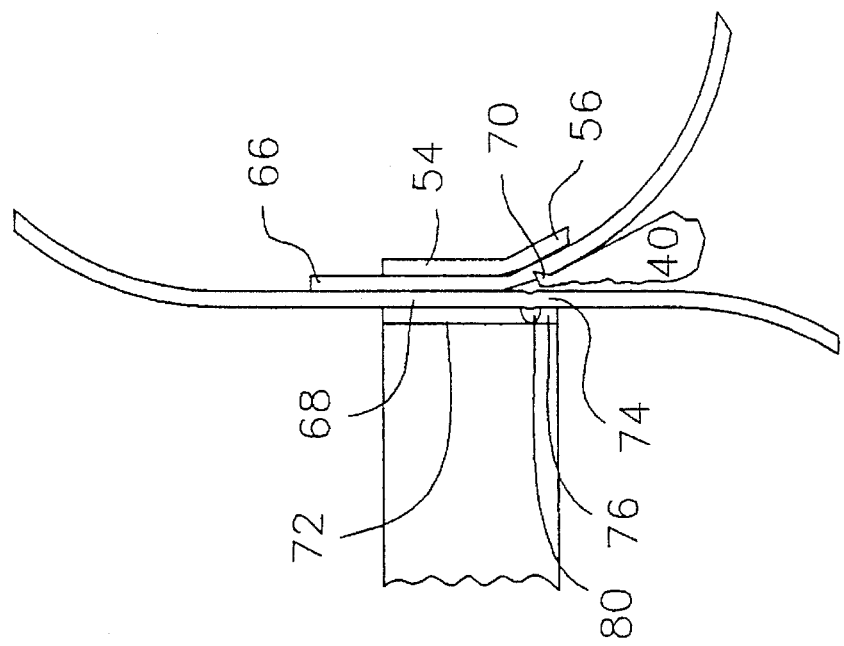
FIG. 8 is a fragmentary vertical view of the tape loop as clamped in the gun prior to stock run separation.

Following loop formation, tightening of the loop to close tight embrace about the article bundle is effected, this being an expedient well practiced in the art. During the tightening or cinching of the loop, it is necessary to effect clamping of the overlapped tape leading end length 66 and a tape length 68 (FIG. 8) remote therefrom which is part of the loop formation, clamping being effected by moving the anvils rearwardly to clamp the tape overlap positioned between the anvils and the clamp front face to the clamp front face. This is required to prevent slippage of the overlapped tape lengths as would cause loop loss, insufficient overlap for secure welding later as well as other difficulties the result of which would be need to discard the operation and start a new tying cycle.

Figure 4:
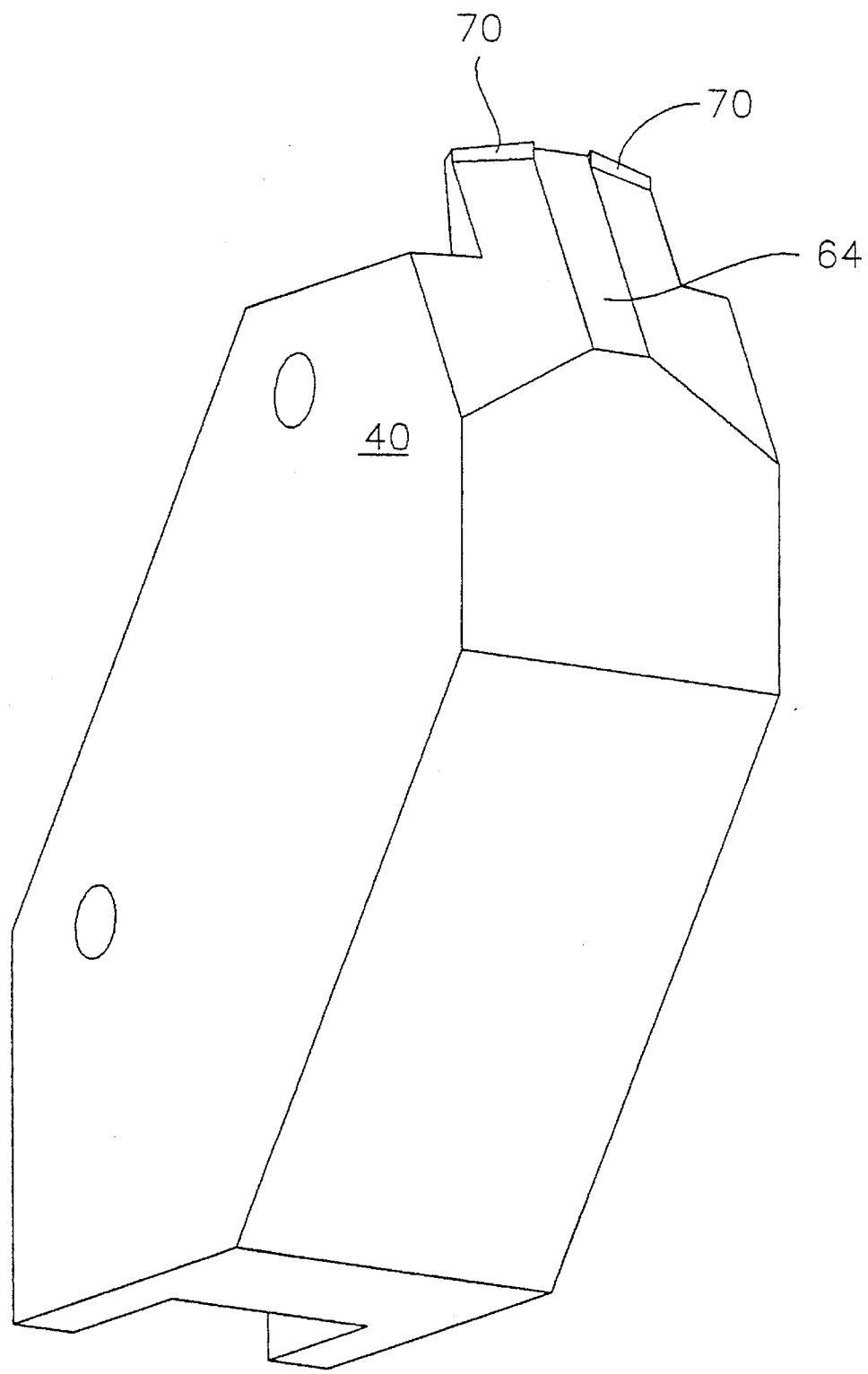
FIG. 4 is a perspective view on greatly enlarged scale of the clamp particularly showing the front face thereof and the tape engaging teeth at the top part thereof which hold the tape during loop welding and subsequent stock run separation from the loop.

To supplement holding of the tape leading end length during loop tightening as well as during welding, the clamp 40 is provided as shown in FIG. 4 with a pair of tape gripping teeth 70, these teeth being at the top of the clamp. How this is achieved is seen with reference to FIG. 8 where the teeth are shown penetrating or dug into the tape leading end length 66. As the tape stock is reverse fed to tighten the loop, the tension in the back feeding tape will cause the teeth to dig securely into the tape and hold it against slippage in the backward direction. The teeth preferably will have a length substantially less than tape thickness, being on the order of about less than half the tape thickness. For example for a tape thickness of 11 mils, a tooth length of 5 mils would be used.

Following the tightening of the loop, the tying cycle control involves tightly clamping at least part of the overlapped tape at the exterior side thereof tightly against an upper part 72 (FIG. 6) of the heating horn tip end while a part 74 (FIG. 8) of the tape stock most immediate the clamped overlap is urged proximal but not into tight contact with the heating horn tip end lower part 76. This condition of tight clamping and proximal urging is readily noted with reference to FIG. 8.

Figure 5:
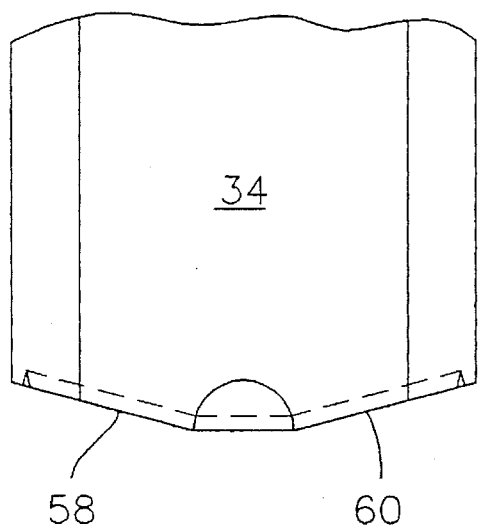
FIG. 5 is a fragmentary top plan view of the front end section of the ultra sonic welding horn.
Figure 6:
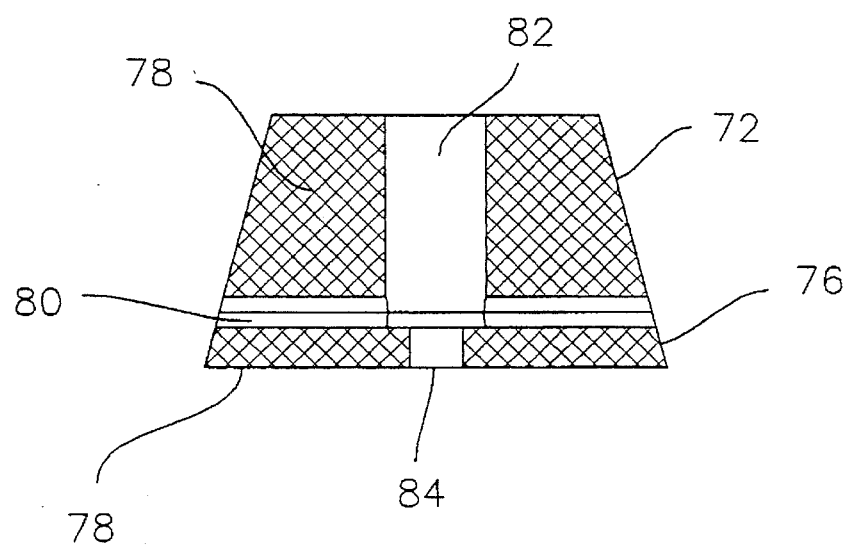
FIG. 6 is an elevational view of the ultra sonic welding horn front face showing the recess and knurled surface configuration thereof.

FIGS. 5 and especially 6 depict the heating horn tip end configuration. Referring to FIG. 6, it is seen that horn tip end is generally trapezoidal in profile being narrower at the top than the bottom and the tip end tapers to the sides and rearwardly. Further, both the upper part 72 and the lower part 76 are roughed as with knurling 78, this to provide good gripping by the tip end upper part of the tape overlap clamped thereagainst. The tip end has a transverse recess 80 of V or arcuate cross section profile and it also has a longitudinal recess of a wider recess part 82 at the top section, and a narrower recess 84 at the lower section. The recess part 82 and the recess 80 receptively can accommodate overlapped tape areas and single tape layer areas. Overlapped tape in a recess is at most only slightly heated during welding. Tape in the recesses is intended to provide strengthened tape areas that resist tearing or severance of the tape stock from the welded loop in preference to tear away at other areas so that no protuberant residue will remain following tearing and all as will be evident from description to be given below.

Making reference now to FIGS. 7, 8, 9a and 9b, the manner of making stock separation from the welded loop will be described. During welding, the tight clamping of the horn tip end against the tape overlap provides that the knurled face of the tip end has good grip on the tape overlap at the exterior side thereof. The rapid friction rubbing of the overlapped tapes produces heating to create surface melt at the knurling as well as in the mass of the tape overlap. The surface melt quickly solidifies because the horn tip end is a heat sink and this cooling enhances the gripping of tape by the horn tip end. After sufficient heating with concommitant melting together and coalescing of the overlapped tape lengths occurs, horn operation will cease and the melted together tape mass allowed to set.

Figure 7:
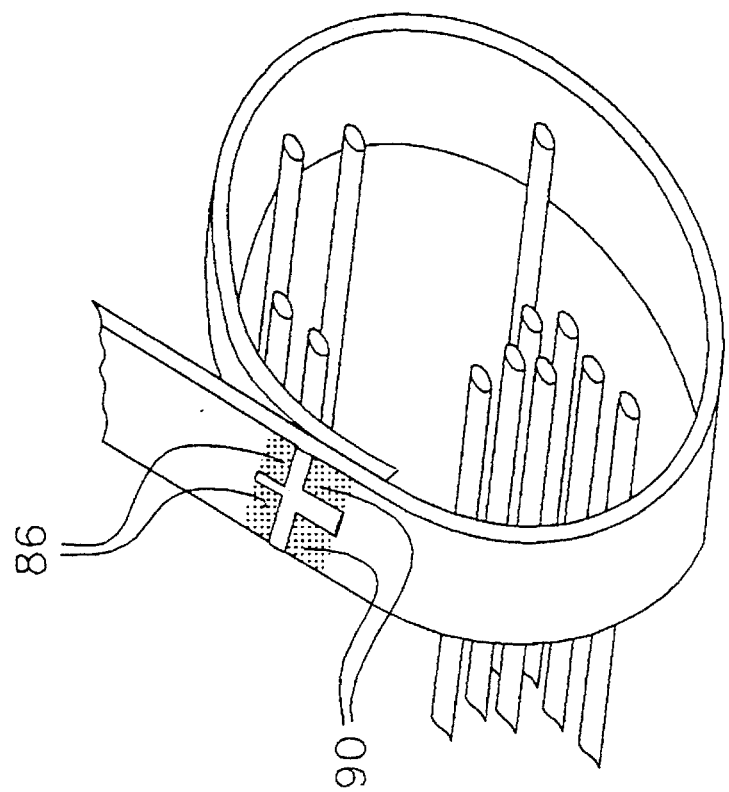
FIG. 7 is a perspective schematic depiction of the welded tape loop as such is prior to the separation of the stock run therefrom, numbers of elongated articles as representative of a bundle tied with the loop being shown in this figure.

During the heating, the tape length 74 proximal the horn tip end not being in friction contact with other tape material undergoes no melting but the ultra sonic effect on the tape length is to weaken that structure in the areas 86 noted in FIGS. 7 and 9a. This weakening is by way of disrupting the molecular orientation in the tape material from one of generally longitudinal orientation to one of randomly directed orientations. The result is the tape in those areas is less resistant to pull forces or tension applied longitudinally thereto.

Accordingly, if a pulling force is applied to the tape stock in an upstream direction toward the tape stock source, as for example by rapid reverse feeding of the tape, the breaking of the tape will start in area 88 (FIG. 9a) as that area will start to elongate further deteriorating its structure (the weldment 90 is much stronger and unaffected by the pull force), tearing will initiate and rapidly spread laterally along a line as at 92. The result is full separation of the tape stock from the welded loop and without retention of any protuberance or tab line tape piece. There possibly will remain some fuzz-like residue as at 94 (FIG. 9b), but such is not a problem in terms of being an obstruction etc. The separated tape stock 96 also is shown in removed position in FIG. 9b.

Figure 10:
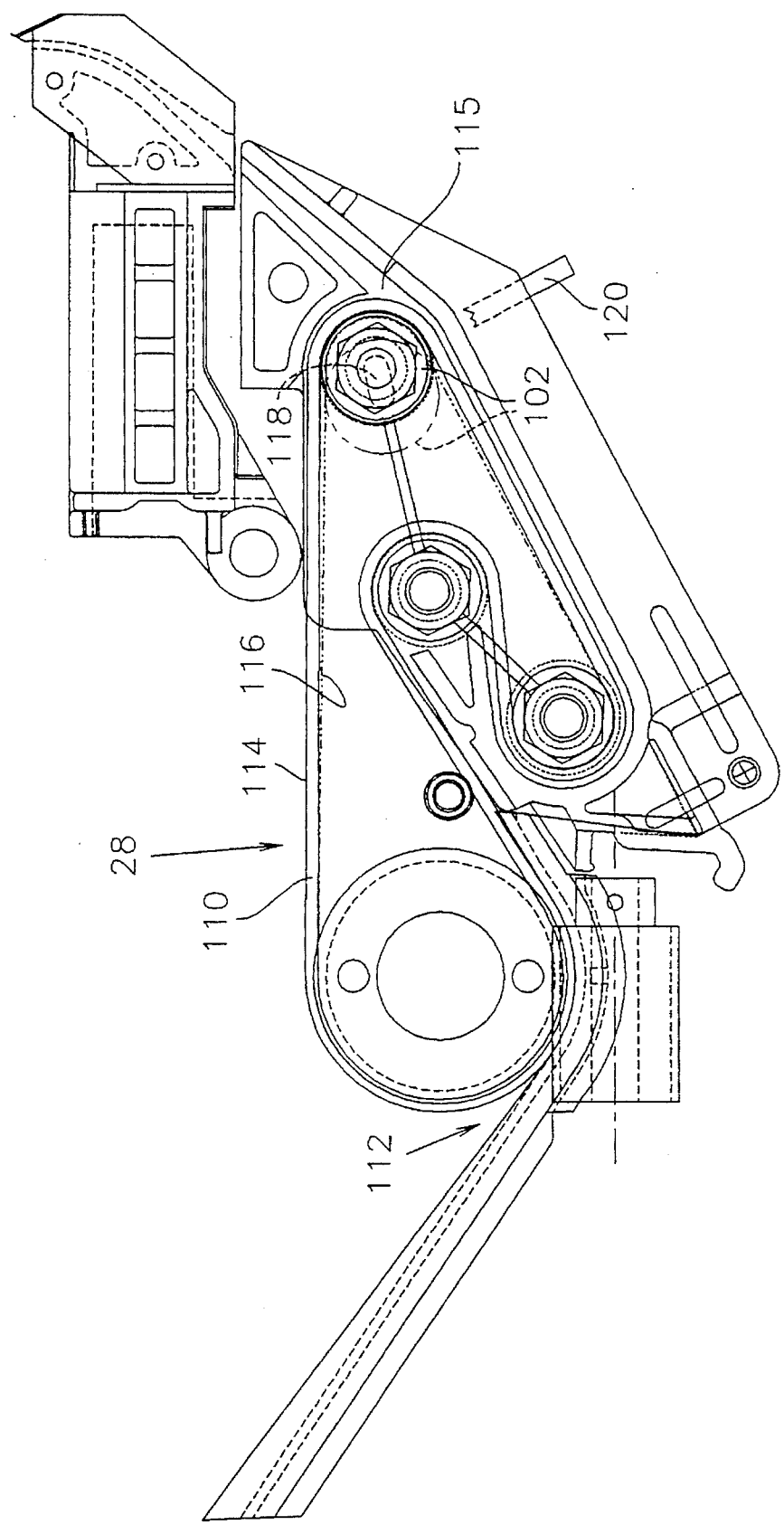
FIG. 10 is a side elevational view of the tape feed components in the tie gun and showing additionally a tape jam quick release feature employed for facilitating clearing a jam.

A feature of the invention is the capacity to quickly and easily remove tape jams from the tie gun. Referring to FIG. 10, The power feed means 28 for feeding tape in the advance (and reverse as well) direction includes rollers 100 and 102, a smooth surface capstan 104, a timing gear 106 and a feed belt 108 mounted on these components to traverse an endless course 110 of predetermined length and in a normal predetermined condition of belt tension around the rollers and capstan. Tape 26 off feeding from stock 24 is transported by the belt from an entry as at 112 to the belt course to a discharge therefrom as at 115 which directs the tape toward the jaws 20, 22 via the earlier described funnel envelope F. At all times in the feed course, the tape is in contact with a smooth face side 114 of the belt 108, the opposite belt face 116 carrying teeth which engage with companion teeth on the timing gear 106.

When the tape enters a bite between the belt 108 and capstan 104, the tape in forward travel receives positive forward drive. In a reverse drive mode the drive from the belt/capstan to the tape is of much tighter or greater tension since it is required that there be no slippage of the tape in reverse drive. In forward drive, at the capstan there is greater tolerance for some belt slippage on the capstan.

If a jam of tape occurs in the tie gun, release of same so that the jammed tape can be pulled out of the gun is quickly and easily done. This is possible since guide roller 102 is adjustably mounted. Normally it is positioned as shown in solid lines to maintain the predetermined tension in the belt. If a jam takes place, the need for allowing release is to reduce the belt tension. This can be done by pivoting or sliding the guide roller mounting location, e.g., in a mounting slot 118 so that the roller moves to the dashed line position. This results in belt tension release sufficient to allow tape in the gun to be pulled out therefrom in either forward or rearward directions. A lever 120 connected to the guide roller 102 mounting can be actuated by the operator to adjustably move the guide roller between the dashed and solid line positions and vice versa. The lever may incorporate a lock release (not shown) acting to hold the guide roller in secured solid line position for normal feed operations.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tie wrap device for tightly winding a tape loop of a polymeric material tape encirclingly around a bundle of longitudinally arrayed articles, said device comprising a pair of jaws movable between an open condition wherein the jaws are positioned to gird the article bundle to a closed condition in which the jaws present an encirclement of the bundle so that a tape feed from a tape stock can be advanced around an inner periphery of the jaws in a bundle encircling loose tape loop that includes overlap of a tape leading end length with stock length remote from the said tape leading end, means for tightening the loose loop in a tight closely encircling course about the said article bundle an ultra sonic heating horn having a knurled tip end proximal an exterior side location of the tape overlap, a clamp having a front face adjacent said heating horn and positioned adjacent below the said tape overlap exterior side location, and a pair of anvils having face surfaces positionable in facing relation to an inner side location of the tape overlap and movable to urge at least some of the tape overlap at the exterior side location thereof into tight contact with at least a part of the heating horn tip end, the anvil face surfaces and the horn tip end being configured and disposed such that other parts of the tape overlap at the exterior side thereof are closely proximal the horn tip end, said heating horn tip end having at least one inward recess therein extending transversely of the horn tip end and a further inward recess extending longitudinally therein, said recesses accommodating at least some of said other parts of the tape overlap thereby to obviate tight contact of said some other parts with the horn tip end, said ultra sonic heating horn being Operable to effect sufficient heating of the tape overlap part in tight contact with the horn tip end to cause melt coalescence of the material in the tape overlap part which upon cooling establishes weldment of at least part of the tape stock leading edge length to at least part of the remote length part, the ultra sonic heating horn being operable to effect at least some molecular alignment disruption in the tape material at the tape overlap exterior side proximal the horn tip end but not in tight contact therewith so that where so disrupted the tape material is weakened sufficiently to allow separation of tape stock upstream of the weldment from the loop along a substantially non residue leaving break course effected with a pulling force applied to the tape stock in a direction upstream of the weldment, said further recess being wider at a top end of the horn tip end than at a bottom end of said horn tip end.

2. The tie wrap device of claim 1 in which the said at least one and said further recesses are of V or arcuate section profile.

3. The tie wrap device of claim 1 in which the clamp front face has a central flat surface and side surfaces adjacent the central surface tapering rearwardly of the central flat surface, the anvils having longitudinal inner edges which when the anvils are moved to urge the tape overlap into tight contact with the horn tip end are spaced from each other and gird the clamp front face central flat surface but forwardly thereof.

4. The tie wrap device of claim 1 further including means for power feeding tape from the stock thereof in an advance direction and to the pair of jaws.

5. The tie wrap device of claim 4 in which said tape feed means are operable to reverse feed tape towards the stock and therewith apply pulling force to the tape stock for tightening the loose loop and for separating the tape stock from the weldment.

6. The tie wrap device of claim 1 in which the anvil face surfaces are rearwardly facing and have upper and lower parts, the lower parts being angulated forwardly relative to the upper parts, the said anvil face surfaces when the anvils are in a location intermediate fully extended forward and fully retracted rearward positions thereof constituting along with the front face of the clamp, a funnel defining guidance envelope through which the tape leading edge passes enroute to making entry onto the inner periphery of the closed jaws at the outset of a device tying cycle.

7. The tie wrap device of claim 4 in which the power feed means for feeding tape in an advance direction includes a plurality of rollers and a feed belt traversing an endless course of predetermined length and in normal predetermined condition of belt tension around said rollers, tape off feeding a tape stock source being transported by the belt from an entry to the belt course to a discharge therefrom which directs the tape toward the jaws, one of said rollers being adjustably supported for movement upon occurrence of a tape feed jam in the device from a first normal mounting location to a second location in which the belt is loosened to reduce the tension and therewith facilitate removal pull out of tape from the device to release the tape jam.

8. The tie wrap device of claim 7 in which one of said rollers is a smooth faced capstan, tape advancing from the stock entering a bite between the belt and capstan and passing under positive drive therefrom to the belt course discharge in passage around idler rollers.

9. The tie wrap device of claim 7 in which the feed belt is smooth faced at one side face thereof an opposite belt side face carrying teeth cooperating with a belt drive gear, the belt course being arranged such that the tape in its advance is always in contact with the smooth face side of the belt.

10. The tie wrap device of claim 1 in which the clamp front face carries frontally facing teeth at an upper edge thereof and facing the tape leading end length such as to penetrate the leading tape length at a location thereon to hold said leading end length fixed when the loose loop is tightened and during ultra sonic heating thereby preventing displacement of said leading end length from an overlap thereof with a stock length remote from said leading end.

11. The tie wrap device of claim 10 in which the clamp frontally facing teeth have a length less than a thickness of the tape.

12. The tie wrap device of claim 11 in which the teeth length is less than about half the thickness of the tape.

13. A tie wrap device for tightly winding a tape loop of a polymeric material tape encirclingly around a bundle of longitudinally arrayed articles, said device comprising a pair of jaws movable between an open condition wherein the jaws are positioned to gird the article bundle to a closed condition in which the jaws present an encirclement of the bundle so that a tape feed from a tape stock can be advanced around an inner periphery of the jaws in a bundle encircling loose tape loop that includes overlap of a tape leading end length with stock length remote from the said tape leading end, means for tightening the loose loop in a tight closely encircling course about the said article bundle an ultra sonic heating horn having a tip end proximal an exterior side location of the tape overlap, a clamp having a front face adjacent said heating horn and positioned adjacent below the said tape overlap exterior side location, and a pair of anvils having face surfaces positionable in facing relation to an inner side location of the tape overlap and movable to tightly urge the tape overlap at the exterior side location thereof into tight contact with the heating horn tip end face surfaces, there being an array of transverse and longitudinal recesses in the horn tip end wherein parts of the tape overlap are accommodated to obviate tight contact of said parts with the horn tip end so that when said ultra sonic heating horn is operated to heat tape overlap parts in tight contact with the horn tip end it causes melt coalescence of the material in the tape overlap parts which upon cooling establishes weldment of at least part of the tape stock leading edge length to at least part of the remote length part, operation of the ultra sonic horn further effecting at least some molecular alignment disruption in tape overlap material accommodated in said recesses so that such disrupted material is weakened sufficiently to allow separation of tape stock upstream of the weldment from the loop along a substantially non residue leaving break course effected with a pulling force applied to the tape stock in a direction upstream of the weldment.

\* \* \* \* \*